March 8, 1927.
A. RODRIGUEZ
1,620,394
HAND FAN
Filed Feb. 23, 1926
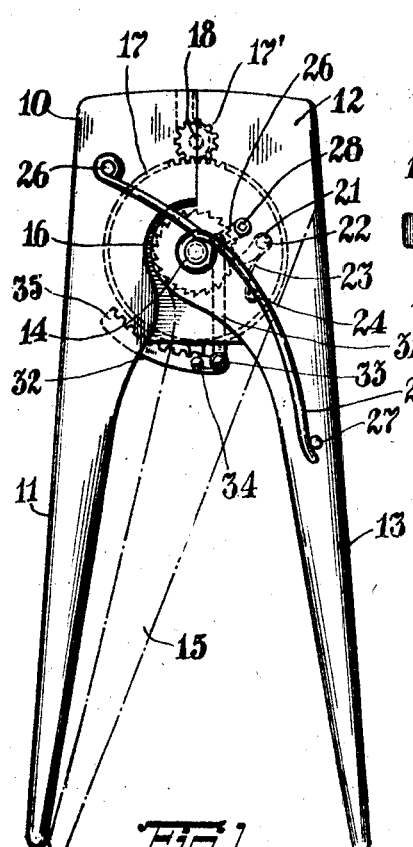
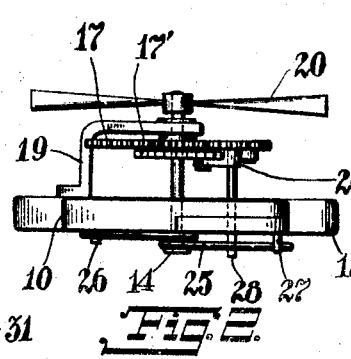
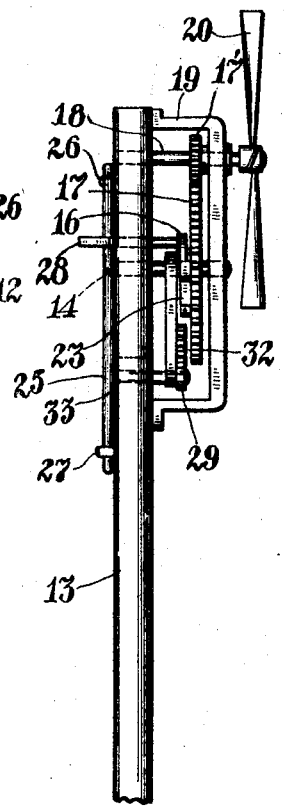
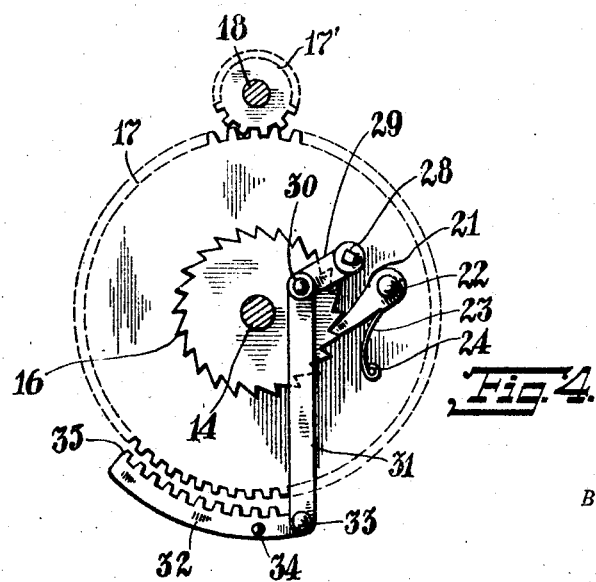
INVENTOR.
Alfredo Rodriguez
BY
ATTORNEY Patented Mar. 8, 1927. 1,620,394

UNITED STATES PATENT OFFICE.

ALFREDO RODRIGUEZ, OF ANGIOLA, CALIFORNIA.

HAND FAN.

Application filed February 23, 1926. Serial No. 89,831.

This invention relates generally to fans, the invention having more particular reference to a novel type of hand operated fan.

The object of the invention is to provide a fan of novel construction and arrangement of parts, hereinafter more fully described, claimed, and illustrated in the accompanying drawing, in which—

Fig. 1 shows a rear elevational view of my improved hand operated fan.

Fig. 2 shows a top plan view thereof.

Fig. 3 shows a side elevational view thereof.

Fig. 4 shows an enlarged rear elevational view of the operating mechanism as used in my improved device.

As here embodied my improved hand operated fan comprises a body member 10, having a protruding handle element 11, the body member is notched so as to receive the upper portion 12 of the second handle element 13, which is pivotally attached to the body member 10, by a pin 14. The above mentioned construction being such as will permit the second handle element 13 to be hinged, pivoted, or swung against the handle element 11, as designated by the reference numeral 15, in Fig. 1, of the accompanying drawing.

The pin 14 has rotatively attached thereto a ratchet wheel 16, which is rigidly attached to the gear 17, at its center, which meshes with the pinion 17' rigidly attached to the pin 18, which is rotatively mounted in the body member 10 and in the support 19, which is rigidly attached to the body member 10. The pin 14 extends through the support 19 and has rigidly attached thereto a fan 20 having a plurality of blades.

As a means of rotating the fan 20, when the second handle element 13 is pressed or otherwise forced against the handle element 11, by the hand of the operator, I have provided a pawl 21 pivotally attached to the second handle element 13, as at 22, the pawl 21 is held in engagement with the teeth of the ratchet wheel 16 by a suitable spring 23, pivotally attached to the second handle element, as at 24.

As a means of normally holding the second handle element 13 in a relatively extended position, as shown in Fig. 1 of the accompanying drawing, I have provided a suitable spring 25, which is twisted or wrapped around the pin 14, and has one extremity attached to a pin 26 protruding from the body member 10, and has its other extremity bent or otherwise formed over a second pin 27, protruding from the second handle element 13.

It will be understood that when the second handle element 13 is returned to its normal position by the spring 25 that the pawl 21 will slide over the teeth of the ratchet wheel 16.

As a means of rotating the said fan 20 in both directions, I have provided an operating pin 28 rotatively mounted in the second handle element 13, and having attached at its inner extremity a lever 29, it being understood that the operating pin extends through the second handle element, and that the said operating pin is so located as to allow the said lever 29 to disengage the pawl 21, when the operating pin is rotated counter clockwise, or to allow the said pawl to engage the ratchet wheel 16 when the operating pin is positioned as designated in Fig. 4 of the accompanying drawing. The said pin 28 being frictionally held in the desired position. The lever 29 has pivotally attached thereto, as at 30 a depending rod 31 which is also pivotally attached to one extremity of an arm 32, as at 33, the said arm being pivotally attached to the second handle element 13, as at 34, and having suitable teeth 35, which may be engaged with the heretobefore mentioned gear 17 when the said operating pin 29 is rotated so as to disengage the pawl 21, when the operating pin is in the position shown in Fig. 4 of the accompanying drawing.

It will be obvious, when the teeth 35 of the arm 32 are engaged with the gear 17, that when the second handle element 13 is pressed or otherwise forced against the handle element 11 by the hand of the operator, that the fan 20 will be rotated in one direction, and that when the said second handle element is returned to its normal position by the spring 25, that the fan will be rotated in an opposite direction.

While I have above described the preferred form, construction and arrangement of the several elements employed, it will be understood that the device is, nevertheless, susceptible of considerable modification therein, and I therefore, reserve the privilege of resorting to all such changes as may be fairly embodied within the spirit and scope of the invention as claimed.

Having thus described my invention what

I claim is new and desire to protect by Letters Patent of the United States is as follows:

1. A hand operated fan comprising a plurality of radial fan blades, operating mechanism for alternately driving said fan blades in one direction and in an opposite direction thereafter for alternating the direction of a draft of air, and operating mechanism for rotating said fan blades continuously in one direction for providing a continuous draft of air, said driving mechanism being adapted to be disengaged for permitting individual application of either one thereof.

2. A hand operated fan comprising a pair of pivotally attached handle members, a bracket mounted on one of said handle members, a shaft journaled in the upper end of said bracket, a plurality of fan blades rigidly attached to said fan, a pivot pin rigidly attached to one of said handle members and extending there beyond, a ratchet wheel rotatively mounted on said pivot pin, a driving gear fixed to said ratchet wheel adapted to rotate said upper shaft and the blades attached thereto, a pawl pivoted to the other handle member adapted to rotate said ratchet wheel and the driving gear fixed thereto continuously in one direction for producing a continuous draft of air, said pawl being adapted to be disengaged from said ratchet wheel, and driving mechanism comprising a lever adapted to engage the teeth of said driving gear and connected with one of said handles for rotating said gear alternately in opposite directions for producing alternate oppositely directed drafts of air.

3. A hand operated fan comprising a plurality of fan blades, driving mechanism for rotating said plurality of fan blades alternately in opposite direction for producing alternate oppositely directed drafts of air.

4. A hand operated fan comprising a pair of pivotally attached handles, a fan proper rotatively mounted on one of said handles, driving mechanism comprising a driving gear, operating mechanism connected with said pivotally attached handle member adapted to rotate said driving gear in one direction during the inward movement of the extremities of said handle members and in the opposite direction during the outward movement of said extremities for producing alternate oppositely directed drafts of air.

In testimony whereof I have affixed my signature.

ALFREDO RODRIGUEZ.